Patented June 8, 1943

2,321,544

UNITED STATES PATENT OFFICE 2,321,544

PREPARATION OF METHYLOL UREA

Harry R. Dittmar and Daniel E. Strain, Wilmington, Del., assignors to E. I. du Pont de Nemours & Company, Wilmington, Del., a corporation of Delaware No Drawing. Application May 22, 1940,
Serial No. 336,582

5 Claims. (Cl. 260—69)

This invention relates to the production of condensation products, and more particularly to the production of urea-formaldehyde condensation products.

An object of this invention is to provide a new and improved method for producing urea-formaldehyde condensation products.

Other objects and advantages of this invention will be apparent by reference to the following specification.

According to this invention, urea-formaldehyde condensation products of improved characteristics are prepared by effecting reaction between urea and an aqueous formaldehyde containing from 60 to 90% formaldehyde. Preferably, the reaction is effected in a pH range of from 6.5 to 12.0, with highly desirable results obtained within the more restricted pH range of 7.2 to 8.5. The ratio of reactants ranges preferably from 0.5 to 2.5 moles formaldehyde per mole of urea.

The reaction of urea and highly concentrated formaldehyde may be effected over a fairly broad range of temperatures, not greatly over 70° C., representing the preferred upper limit while the lower limit is set by the lowest temperature at which the reactants remain liquid, i. e., a temperature not greatly below 10° C.

Liquidity of reactants, and the consequent lower temperature limits, are dependent to a great extent upon the concentration of the formaldehyde utilized. Thus, the melting point of 80% formaldehyde is about 65° C., and of 85% formaldehyde, about 75° C. Until addition of urea, which increases greatly the fluidity of concentrated formaldehyde, the temperature of the reactants should be kept at a point, preferably, above the melting point of the formaldehyde. The effect of urea upon fluidity of formaldehyde is well illustrated by the fact that by addition of urea according to this invention to 80% formaldehyde, which has a normal melting point of about 65° C., the reaction may be carried on at 50° C. and a liquid product discharged from the reaction vessel at this temperature. Actually, the preferred temperature for reaction is in the neighborhood of 50° C., varying in preferred operation but a few degrees, at the most, above or below this temperature.

It should be understood at the outset that when urea is added according to this invention to concentrated formaldehyde solutions which are in viscous to fluid condition there is a rapid drop in temperature, due to the negative heat of solution of the urea. Following this rapid drop in temperature there is a period of reaction time between the reactants to which period reference is made in this description. It is this particular reaction period which may vary in temperature over a wide range, although preferably this temperature is maintained in the neighborhood of 50° C. Thus, we have found that if a temperature of about 70° C. is exceeded for the reaction period (following the initial temperature drop) the resulting product of reaction has poor water solubility and tends to be undesirably soft after crystallization.

The time of reaction, i. e., period of time between the initial temperature drop and completion of the reaction, varies greatly depending upon the concentration of the formaldehyde as well as the pH of the reaction solution. This reaction period has as its minimum, however, a sufficient length of time within which a homogeneous system is established, i. e., complete solution of the urea, and as its maximum a length of time short of crystallization of the reaction products in the reaction vessel. Varying periods of reaction time are illustrated in the following examples in which there are shown other differing conditions such as those of pH, concentration of formaldehyde, and the like.

The concentration of formaldehyde may vary over an effective range of from about 60 to 90% as previously indicated, although it is preferred to use formaldehyde of about 75 to 85% strength. This concentrated formaldehyde may be obtained by distilling relatively dilute aqueous formaldehyde until the desired concentration is reached, e. g., the preferred concentration of 75 to 85%, or by the addition of paraformaldehyde to the ordinary dilute formaldehyde of about 37% strength until a concentration of the desired percentage of formaldehyde is attained.

The pH of the formaldehyde may be adjusted to the ranges previously mentioned by the addition of substances such as potassium hydroxide, sodium hydroxide, tetramethyl ammonium hydroxide and the like. There may also be employed compounds such as sodium phosphate, triethanolamine, guanidine carbonate, or similar substances or a mixture of substances capable of buffering action, along with a material such as an alkaline hydroxide for producing the desired pH.

It is advantageous, in adjusting the pH of the concentrated formaldehyde, to accomplish the adjustment at a temperature between 75 and 95° C., a temperature of about 85° C. being preferred.

When fillers such as cellulose, sulfite pulp, wood flour and the like are mixed with the reaction product of urea and concentrated formaldehyde, at least about 20% water is desirable for satisfactory wetting of the filler by the reaction mixture and hence lower concentrations of formaldehyde of the order of 60 to 75% are preferred. A filler is mixed with the urea-formaldehyde reaction product in suitable equipment, the mixing preferably being started while the reaction product is still in a liquid state. After thorough mixing, the liquid reaction product may be dried at a moderate temperature, comminuted and used for molding purposes.

In the production of unfilled urea-formaldehyde condensation products, we prefer to use formaldehyde of 75 to 90% concentration so that the urea reaction product will be firm, dry, and solid enough to comminute, handle, and package as a solid without requiring a drying step. As a matter of fact when operating over the lower ranges of formaldehyde concentration, within the preferred range of 60 to 90%, the product resulting from urea-formaldehyde concentration may require a separate drying step in order to remove the excess water. However, in the higher formaldehyde concentrations, say, 75 to 85%, no additional drying step is necessary and our product is sufficiently dry for immediate use.

After reaction between urea and concentrated formaldehyde according to this invention the product is preferably transferred from the reaction vessel to trays or their equivalent in order that the reaction product may be placed in relatively attenuated form before the reaction goes so far as to result in solidification or crystallization of the reaction product. In such attenuated form, the final product is allowed to crystallize at 20 to 50° C., and disintegrated to a comminuted condition. If a filler such as previously described is employed, it is preferably added to the fluid reaction mass after substantial homogeneity is attained and before it has lost its fluidity.

The following examples will serve to indicate how the invention may be practiced, although these examples are to be considered illustrative and not as limiting the invention.

Example 1

Into a kettle containing agitating means there was placed 450 grams of 80% formaldehyde-water solution at a temperature of 95° C. The pH of this solution was adjusted to 7.55 by the addition of 5.4 cc. of triethanolamine (buffer) and 4.05 cc. of 2N sodium hydroxide solution and the buffered solution was then agitated during the rapid addition of 720 grams of crystalline urea. The temperature of the reactants, having first dropped rapidly to 40° C. (because of negative heat of solution of urea) was raised to 50° C., and agitation of the reactants was continued at that temperature for a total of 45 minutes. The liquid product was then removed from the reaction vessel and allowed to solidify at 20–50° C. The resultant product was a relatively hard mass having the appearance of chalk and being readily disintegrated to a finely crystalline powder. Upon analysis, the final product was found to correspond substantially wholly to monomethylol urea.

Example 2

Into a vessel such as described in Example 1, there was introduced 450 grams of 80% formaldehyde at a temperature of 95° C. and thereafter its pH was adjusted to 7.5 by the addition of 2.57 cc. of 10% monosodium phosphate solution (buffer) and 7.65 cc. of 2N sodium hydroxide solution. The solution was then agitated during rapid addition of 355 grams urea. In approximately 3 minutes the temperature had dropped to 50° C. and thereafter agitation was continued at 50° C. until a total period of 1 hour had elapsed. The product, when discharged, cooled, crystallized, and disintegrated, had the same general characteristics as that of Example 1. Upon analysis the final product was found to correspond substantially wholly to dimethylol urea.

Example 3

As described in Example 1, 1498 grams of 80% formaldehyde (at 95° C.) was conducted to a vessel having stirring means, buffered with 17.98 cc. of 10% triethanolamine and its pH adjusted to 7.95 by the addition thereto of 13.02 cc. 2N sodim hydroxide solution. To the buffered solution was quickly added 1170 grams of urea, whereupon the temperature fell to 50° C. After an hour at this temperature, the resultant clear solution was allowed to cool in crystallizing trays. The material was substantially the same in physical appearance as that obtained in Examples 1 and 2. Upon analysis it was found to correspond substantially wholly to dimethylol urea.

Example 4

As described in Example 1, 181 grams of 80% formaldehyde (at 90° C.) was buffered by addition thereto of 2.16 cc. of 10% triethanolamine and its pH adjusted to 7.8 by the addition of 1.02 cc. of 2N sodium hydroxide solution. 193 grams urea was then added. At the expiration of 50 minutes, agitation having been continued throughout the reaction, and a temperature between 46 and 50° C. having been maintained followed a drop from 90 to 50° on addition of the urea, the resultant clear solution was conducted to crystallizing trays where it was cooled to room temperature. The product was substantially the same in physical appearance as that obtained in Examples 1 and 2 and upon analysis was found to correspond substantially wholly to a mixture of equal parts of mono- and dimethylol ureas.

Example 5

Into a stainless steel kettle there was introduced 102 pounds of 80% formaldehyde at a temperature of 90° C. and thereafter its pH was adjusted to 8.05 by addition of 555 cc. of 10% triethanolamine solution (buffer) and 280 cc. of 2N sodium hydroxide solution. The solution was then agitated during rapid addition of 81 pounds of urea, the temperature rapidly dropping to about 70° C. Thereafter agitation was continued, while the kettle was extraneously cooled to about 50° C., until a total period of ¾ hour had elapsed. The resultant product, on being conducted to crystallizing trays and allowed to cool to room temperature, was similar to that described in Example 2.

Example 6

Into a stainless steel kettle such as described in Example 5 there was introduced 10.32 pounds of formalin in which was dissolved 45.7 grams of monosodium phosphate ($NaH_2PO_4H_2O$). The formalin solution was maintained at a temperature of 22° C. by external temperature control of the kettle, and there was added to the formalin solution 34.3 grams of sodium hydroxide in 100 cc. of water. The pH of the resultant solution was 10.47. Agitation was commenced and there was then added 22.18 pounds of paraformaldehyde and 25 pounds of urea during constant agitation. The temperature in the kettle dropped to approximately 13° C. and thereafter slowly rose to 30° at the expiration of approximately 2½ hours. The temperature was maintained thereafter for approximately 1 hour and a quarter at 22 to 25° by external cooling and heating and after an over-all time of reaction of 3 hours and 45 minutes, there was added 54.0 cc. of 38% hydrogen chloride. The pH of the resultant mixture was 7.1. At the expiration of 4 hours the resultant reaction products were allowed to crystallize at a temperature of 20 to 50° C. to give a hard product similar to that described in Example 2.

Example 7

A charge of 207 grams of 62% formaldehyde in the liquid state, in a flask equipped with a reflux condenser and stirrer at a temperature of 98° C., was adjusted to a pH of 8.1 by the addition of 1.94 cc. of 10% triethanolamine and 0.54 cc. of 2N sodium hydroxide. Immediately thereafter, 171.5 grams of urea was added. The internal temperature rapidly dropped to about 50° C. and was held at approximately this temperature for 45 minutes by external cooling and heating as required. Mechanical stirring was employed throughout. A clear, liquid, very fluid, product was obtained.

350 grams of this reaction mixture was charged to a Werner-Pfleiderer mixer along with 153 grams of bleached sulfite pulp and mixing was continued for about 1 hour. The product was discharged from the mixer and in a thin layer was dried 5 hours in 125° F. in a current of air. The dried product was comminuted. This resulting product is useful as a molding powder or may be compounded with pigments, dyes, lubricants, accelerators, and the like prior to molding.

Example 8

Into a stainless steel kettle equipped with a close-fitting stirrer there was introduced 58 pounds of 80% formaldehyde at a temperature of 90° C. A mixture of 318 cc. of 10% by volume triethanolamine and 154 cc. of 2N sodium hydroxide was added to adjust the pH to 8.35.

The resulting alkaline solution was agitated during rapid addition of 62 pounds of crystalline urea. Cooling water was introduced to the jacket wall surrounding the reaction vessel and in this manner, together with the cooling effect of urea, reduced the temperature to about 50° C. within 5 minutes. Cooling and heating were thereafter applied as required to maintain an internal temperature of about 50° C. Agitation was continued until a period of 35 minutes had elapsed after the urea addition when the reaction mass was discharged as a slightly viscous, clear liquid and this material was placed in approximately ½ inch layers in stainless steel trays for crystallization.

After solidification in the trays the product obtained was a dense, white, water-soluble cake. Analysis indicated the product to correspond to an equimolar mixture of mono- and di-methylol ureas.

The materials obtained according to this invention are useful in a great number of operations, such as in the sizing of fibers, crease proofing, production of hardened, waterproof, scuff-proof plaster and cement, in the impregnation of wood followed by resinification, in the binding of rock and mineral wools, and the like.

Where, in the specification and claims, the word "formaldehyde" is used, it will be understood that it is meant to describe polymeric as well as monomeric forms of this substance.

Various changes may be made in the details and preferred embodiments of this invention without departing therefrom or sacrificing any of the advantages thereof.

We claim:

1. A process for the preparation of a water-soluble methylol urea from normally solid 75 to 90% formaldehyde which comprises adjusting at a temperature between 75 and 95° C. a 75 to 90% formaldehyde, rendered fluid by heat, to a pH value between 6.5 and 12, thereafter adding urea, controlling the resulting reaction below 70° C. and recovering water-soluble methylol urea as a solid.

2. A process for the preparation of a water-soluble methylol urea from normally solid 75 to 90% formaldehyde which comprises adjusting at a temperature between 75 and 90° C. a 75 to 90% formaldehyde, rendered fluid by heat, to a pH value between 7.2 and 8.5, thereafter adding urea, controlling the resulting reaction below 70° C. and recovering water-soluble methylol urea as a solid.

3. A process for the preparation of water-soluble methylol urea from normally solid 75 to 90% formaldehyde which comprises adjusting at a temperature between 75 and 90° C. a 75 to 90% formaldehyde, rendered fluid by heat, to a pH value between 7.2 and 8.5, thereafter adding urea in the proportion of one mole of urea to from 0.5 to 2.5 moles of formaldehyde, maintaining the reaction mixture in a fluid condition below 70° C. until substantial homogeneity is obtained, and, before it has lost its fluidity, causing the mass to assume a relatively attenuated form and comminuting the cool solid product.

4. A process for the preparation of water-soluble methylol urea from normally solid 75 to 90% formaldehyde which comprises heating solid 75 to 90% formaldehyde to a fluid state at a temperature between approximately 75 and 95° C., adjusting the pH value of the fluid to between 7.2 and 8.5, thereafter adding urea to the fluid mixture in the proportion of one mole of urea to from 0.5 to 2.5 moles of formaldehyde, and maintaining the resulting exothermic reaction at a temperature under 70° C. whereby solid, water-soluble methylol urea is obtained.

5. A process for the preparation of water-soluble methylol urea from normally solid 75 to 90° formaldehyde which comprises introducing urea at a temperature between 75 and 90° C. into 75 to 90% formaldehyde, the formaldehyde being in the liquid phase because of the temperature used, the urea being introduced after adjusting the pH of the fluid formaldehyde to a value between 7.2 and 8.5, controlling the resulting exothermic reaction at a temperature below 70° C. and recovering therefrom solid, water-soluble methylol urea.

HARRY R. DITTMAR.
DANIEL E. STRAIN.